(12) United States Patent
Roberts et al.

(10) Patent No.: US 10,011,215 B2
(45) Date of Patent: Jul. 3, 2018

(54) ILLUMINATED CHROMATIC EMBLEM ASSEMBLY WITH MICRO LEDS

(71) Applicants: Ford Global Technologies, LLC, Dearborn, MI (US); Colonial Plastics, Inc., Clinton Township, MI (US)

(72) Inventors: Richard Roberts, Clinton Township, MI (US); LaRon Michelle Brown, Commerce Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 15/297,219

(22) Filed: Oct. 19, 2016

(65) Prior Publication Data

US 2017/0036594 A1    Feb. 9, 2017

Related U.S. Application Data

(63) Continuation-in-part of application No. 14/275,342, filed on May 12, 2014, now Pat. No. 9,481,296.
(Continued)

(51) Int. Cl.
*B60Q 1/00* (2006.01)
*B60Q 1/26* (2006.01)
(Continued)

(52) U.S. Cl.
CPC .......... *B60Q 1/2615* (2013.01); *B60R 13/005* (2013.01); *F21S 48/33* (2013.01);
(Continued)

(58) Field of Classification Search
CPC ...... B60Q 1/26; B60Q 1/2615; B60Q 1/2619; B60Q 1/2696; B60Q 1/28; B60R 13/00;
(Continued)

(56) References Cited

U.S. PATENT DOCUMENTS 3,341,915 A    9/1967   Knochel et al.
4,208,869 A    6/1980   Hanaoka
(Continued)

FOREIGN PATENT DOCUMENTS

GB    2458302 A    9/2009
JP    61213829 A   9/1986
(Continued)

OTHER PUBLICATIONS

Ray, William J., "Printed Semiconductors," Nth Degree Technologies, available at http://semiconwest.org/sites/semiconwest.org/files/6_William%20Ray_Nth%20Degree.pdf, retrieved on Jun. 26, 2013, 40 pages.
(Continued)

*Primary Examiner* — Jason Moon Han
(74) *Attorney, Agent, or Firm* — Vichit Chea; Price Heneveld LLP

(57) ABSTRACT

An illuminated emblem assembly that includes a power source; a light-producing assembly that is coupled to the power source, supported by a backing member and comprises a plurality of light-emitting diode sources; a chromatic layer comprising an emblem shape over the light-producing assembly, wherein the shape is visible under ambient lighting; and a polycarbonate sealing structure over the chromatic layer that seals the backing member, the light-producing assembly, and the chromatic layer. Further, the sealing structure can comprise a design feature. In addition, the plurality of light-emitting diode sources can be dispersed in the light-producing assembly. The light-emitting diode sources can also be micro-sized elements comprising gallium nitride that are arranged on a positive electrode layer in the form of an ink.

14 Claims, 9 Drawing Sheets

Related U.S. Application Data which is a continuation-in-part of application No. 14/276,434, filed on May 13, 2014, now Pat. No. 9,834,136, said application No. 14/275,342 is a continuation-in-part of application No. 13/526,857, filed on Jun. 19, 2012, now Pat. No. 8,752,989, said application No. 14/276,434 is a continuation-in-part of application No. 13/526,857, filed on Jun. 19, 2012, now Pat. No. 8,752,989.

(51) Int. Cl.

| | | |
|---|---|---|
| *F21V 23/02* | (2006.01) | |
| *F21V 9/08* | (2018.01) | |
| *F21S 8/10* | (2006.01) | |
| *G09F 21/04* | (2006.01) | |
| *G09F 13/06* | (2006.01) | |
| *B60R 13/00* | (2006.01) | |
| *F21Y 115/10* | (2016.01) | |
| *G09F 13/04* | (2006.01) | |

(52) U.S. Cl.
CPC ............... *F21V 9/08* (2013.01); *F21V 23/02* (2013.01); *G09F 13/06* (2013.01); *G09F 21/04* (2013.01); *F21Y 2115/10* (2016.08); *G09F 2013/044* (2013.01)

(58) Field of Classification Search
CPC ......... B60R 13/005; F21V 9/08; F21V 23/02; G09F 13/00; G09F 13/06; G09F 21/04
USPC ...... 362/249.02, 311.02, 487, 496, 509–510, 362/540, 543–545
See application file for complete search history.

(56) References Cited

U.S. PATENT DOCUMENTS

| | | |
|---|---|---|
| 4,443,832 A | 4/1984 | Kanamori et al. |
| 4,788,550 A | 11/1988 | Chadima, Jr. |
| 4,977,695 A | 12/1990 | Armbruster |
| 5,009,020 A | 4/1991 | Watanabe |
| 5,471,554 A | 11/1995 | Rukavina et al. |
| 5,641,221 A | 6/1997 | Schindele et al. |
| 5,806,957 A | 9/1998 | Prior et al. |
| 5,841,738 A | 11/1998 | Kamei et al. |
| 6,045,643 A | 4/2000 | Byker et al. |
| 6,136,161 A | 10/2000 | Yu et al. |
| 6,158,868 A | 12/2000 | Chien |
| 6,930,815 B2 | 8/2005 | Berneth et al. |
| 7,249,869 B2 | 7/2007 | Takahashi et al. |
| 7,582,000 B2 | 9/2009 | Pendlebury et al. |
| 7,748,148 B2 | 7/2010 | Reiland et al. |
| 7,752,791 B2 | 7/2010 | Misawa et al. |
| 7,848,021 B2 | 12/2010 | Asakura et al. |
| 7,866,858 B2 | 1/2011 | Hirzmann |
| 7,952,785 B2 | 5/2011 | Karmhag et al. |
| 8,016,467 B2 | 9/2011 | Eberwein |
| 8,061,861 B2 | 11/2011 | Paxton et al. |
| 8,113,695 B2 | 2/2012 | Meinke et al. |
| 8,246,226 B2 | 8/2012 | Stempinski |
| 8,266,833 B2 | 8/2012 | Pierce et al. |
| 8,303,147 B2 | 11/2012 | Jeon |
| 8,449,161 B2 | 5/2013 | Igoe et al. |
| 8,752,989 B2 | 6/2014 | Roberts et al. |
| 8,753,947 B2 | 6/2014 | Ray et al. |
| 8,770,812 B2 | 7/2014 | Kino et al. |
| 8,906,713 B2 | 12/2014 | Rettke |
| 9,050,937 B2 | 6/2015 | Gong et al. |
| 2004/0104816 A1 | 6/2004 | Wilson |
| 2004/0232434 A1 | 11/2004 | Chen |
| 2006/0083015 A1 | 4/2006 | Yamazaki et al. |
| 2008/0128286 A1 | 6/2008 | Wu et al. |
| 2010/0102538 A1 | 4/2010 | Paxton et al. |
| 2011/0003070 A1 | 1/2011 | Pozo Gonzalo et al. |
| 2011/0128311 A1 | 6/2011 | Wakatsuki et al. |
| 2012/0144705 A1 | 6/2012 | Pierce et al. |
| 2012/0182722 A1 | 7/2012 | Wu |
| 2013/0335997 A1 | 12/2013 | Roberts et al. |

FOREIGN PATENT DOCUMENTS

| | | |
|---|---|---|
| JP | 5061074 A | 3/1993 |
| WO | 2006063325 A2 | 6/2006 |
| WO | 2012049946 A1 | 4/2012 |

OTHER PUBLICATIONS

Ray, William J. et al, "Printed Inorganic Light Emitting Diodes for Solid State Lighting," Nth Degree Technologies Worldwide, pp. 562-564, SID Symposium Digest of Technical Papers, vol. 43, Issue 1, Jun. 2012.

Goodwin, Antuan, "Ford Developing Glow-in-the-Dark Chrome," Nov. 1, 2011, http://www.cnet.com/news/ford-developing-glow-in-the-dark-chrome/, 3 pages.

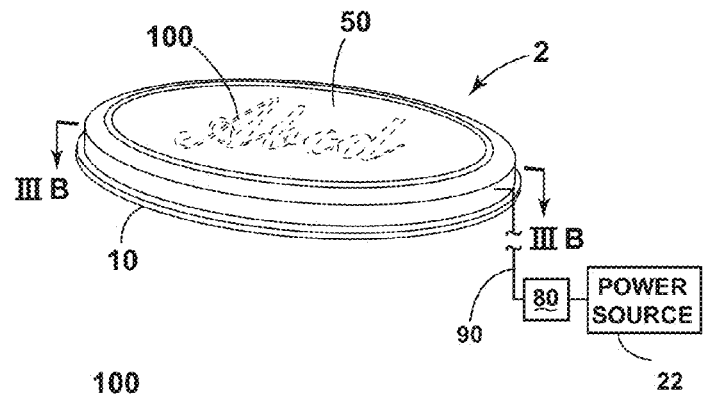
FIG. 3
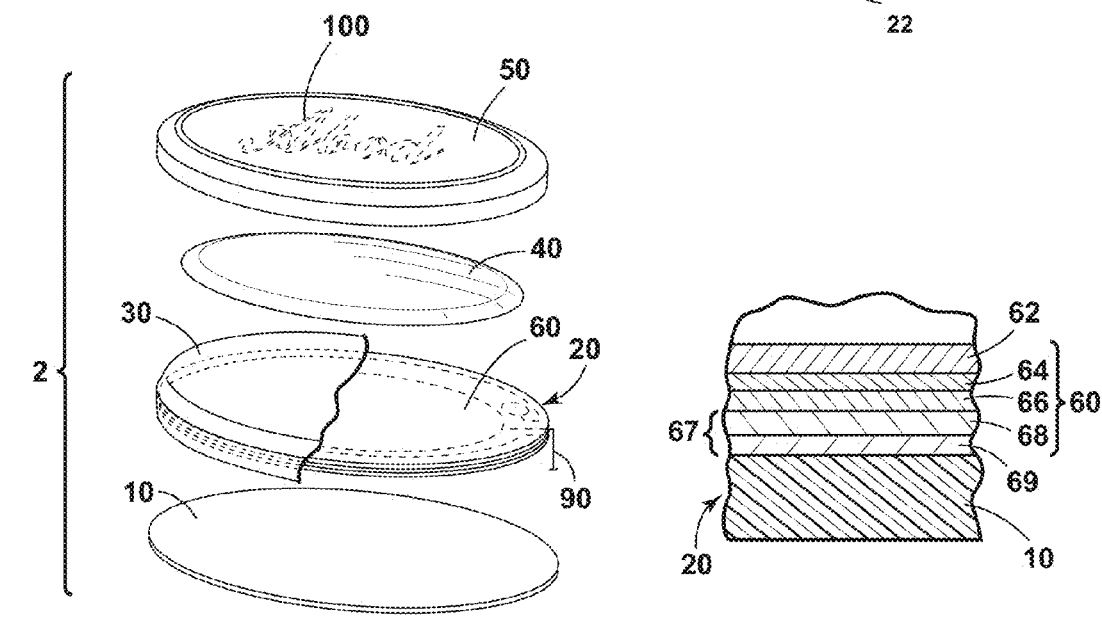
FIG. 3A
FIG. 3C
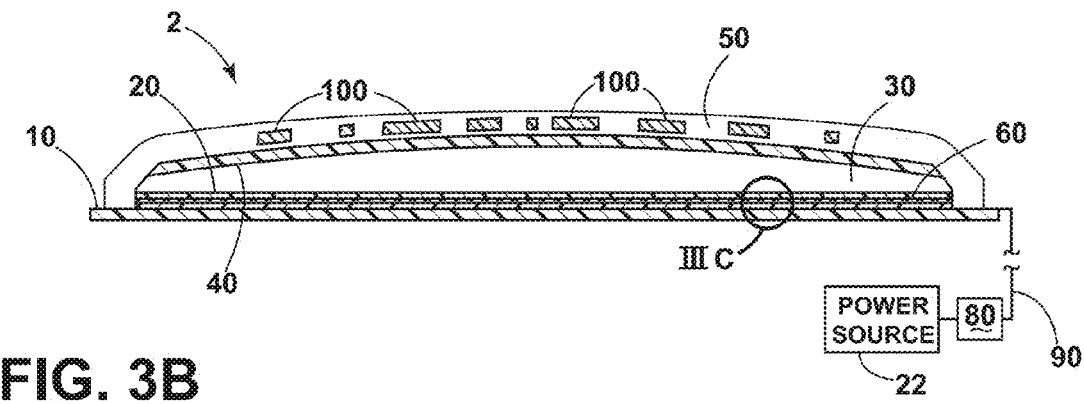
FIG. 3B

ILLUMINATED CHROMATIC EMBLEM ASSEMBLY WITH MICRO LEDS

CROSS-REFERENCE TO RELATED APPLICATIONS

The present application is a continuation-in-part application that claims priority to and the benefit under 35 U.S.C. § 120 of: U.S. patent application Ser. No. 14/275,342, filed on May 12, 2014, entitled "ILLUMINATED CHROMATIC EMBLEM ASSEMBLY WITH MICRO LEDS"; now issued as U.S. Pat. No. 9,481,296, and U.S. patent application Ser. No. 14/276,434, filed on May 13, 2014, entitled "ILLUMINATED CHROMATIC EMBLEM ASSEMBLY," now issued as U.S. Pat. No. 9,834,136, both of which are continuation-in-part applications of U.S. patent application Ser. No. 13/526,857, filed on Jun. 19, 2012, entitled "ILLUMINATED CHROMATIC VEHICLE EMBLEM," now issued as U.S. Pat. No. 8,752,989, the entire disclosures of which are hereby incorporated herein by reference.

FIELD OF THE INVENTION

The present invention generally relates to an emblem, and more particularly relates to an illuminated, chromatic emblem with micro light-emitting diodes (LEDs) for use on a vehicle.

BACKGROUND OF THE INVENTION

Emblems and badges are commonly employed on vehicles to convey various aesthetic and stylistic features, as viewed under ambient lighting conditions and when illuminated. They may also be used to display a vehicle manufacturer's logos, names, trademarks or other graphics. Enhancements to the attractiveness of these badges or emblems may also be desirable.

The engineering and design of emblems and badges for use in a vehicle also requires a consideration of various environmental factors. These units should be sufficiently durable to maintain their attractiveness over the lifetime of the vehicle. In some cases, the emblems and badges may be used in an under-the-hood configuration and require additional temperature resistance.

Accordingly, there is a need for novel and improved illuminated emblem assemblies that are aesthetically pleasing under both ambient lighting and as-illuminated conditions, and possess environmental resistance.

SUMMARY OF THE INVENTION

One aspect of the present invention is to provide an illuminated emblem assembly that includes a power source, a backing member, and a light-producing assembly coupled to the power source and supported by the backing member. The light-producing assembly includes a plurality of light-emitting diode sources. The illuminated emblem assembly further includes a translucent base region over the light sources, an indium-containing chromatic layer over the translucent base region, and a polycarbonate sealing structure that seals the backing member, the light-producing assembly, and the chromatic layer.

Another aspect of the present invention is to provide an illuminated emblem assembly that includes a power source, a backing member, and a light-producing assembly coupled to the power source and supported by the member. The light-producing assembly includes a plurality of light-emitting diode sources. The illuminated emblem assembly further includes a translucent base region over the light sources, an indium-containing chromatic layer over the base region and a UV-stable polycarbonate sealing structure over the chromatic layer that comprises a design feature and seals the backing member, the light-producing assembly, and the chromatic layer.

A further aspect of the present invention is to provide an illuminated emblem assembly that includes a power source, a backing member, and a light-producing assembly coupled to the power source and supported by the backing member. The light-producing assembly includes a plurality of dispersed light-emitting diode sources. The illuminated emblem assembly further includes a translucent base region over the light sources, a chromatic layer over the translucent base region, and a translucent sealing structure that seals the backing member, the light-producing assembly, and the chromatic layer.

An additional aspect of the present invention is to provide an illuminated emblem assembly that includes: a power source; a light-producing assembly that is coupled to the power source, supported by a backing member and comprises a chromatic layer comprising an emblem shape over the light-producing assembly; and a polycarbonate sealing structure over the chromatic layer that seals the backing member, the light-producing assembly, and the chromatic layer. Further, the shape is visible under ambient lighting.

Another aspect of the present invention is to provide an illuminated emblem assembly that includes: a power source; a light-producing assembly coupled to the power source, supported by a backing member, and comprises a chromatic layer over the light-producing assembly; and a UV-stable polycarbonate sealing structure over the chromatic layer that comprises a design feature and seals the backing member, the light-producing assembly, and the chromatic layer.

A further aspect of the present invention is to provide an illuminated emblem assembly that includes: a power source; a light-producing assembly that is coupled to the power source, supported by a backing member, and comprises a chromatic layer over the light-producing assembly; and a translucent sealing structure over the chromatic layer that comprises a design feature and seals the backing member, the light-producing assembly, and the chromatic layer.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a top-down perspective view of an illuminated vehicle emblem assembly, according to a third embodiment;

FIG. 3A is an exploded, perspective view of the illuminated vehicle emblem assembly shown in FIG. 3;

FIG. 3B is a cross-sectional view of the illuminated vehicle emblem assembly shown in FIG. 3 along line IIIB-IIIB;

FIG. 3C is an enlarged, cross-sectional view of the light source assembly contained in the illuminated vehicle emblem assembly shown in FIG. 3;

DETAILED DESCRIPTION OF THE PREFERRED EMBODIMENTS

Figure 2:
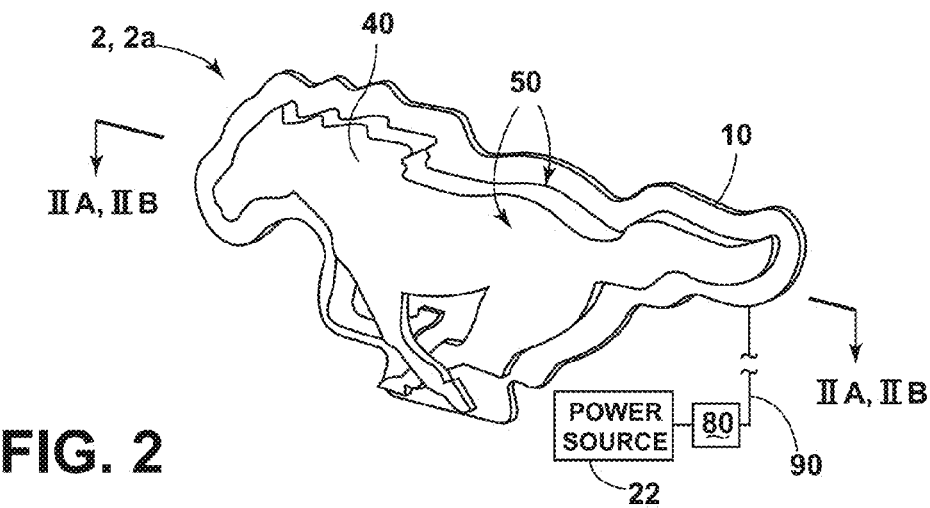
FIG. 2 is an enlarged, top-down perspective view of an illuminated vehicle emblem assembly according to two embodiments.
Figure 2A:
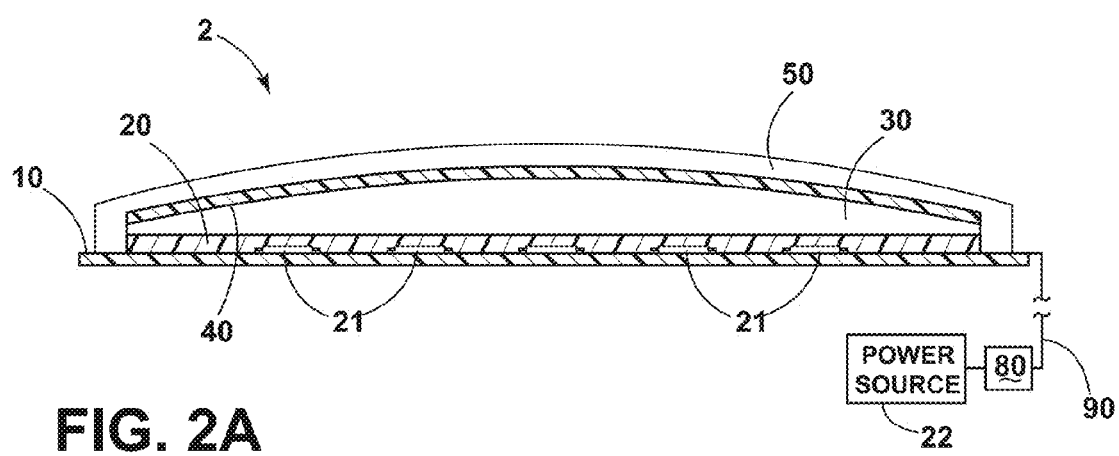
FIG. 2A is a cross-sectional view of the illuminated vehicle emblem assembly shown in FIG. 2 along line IIA-IIA according to a first embodiment.
Figure 2B:
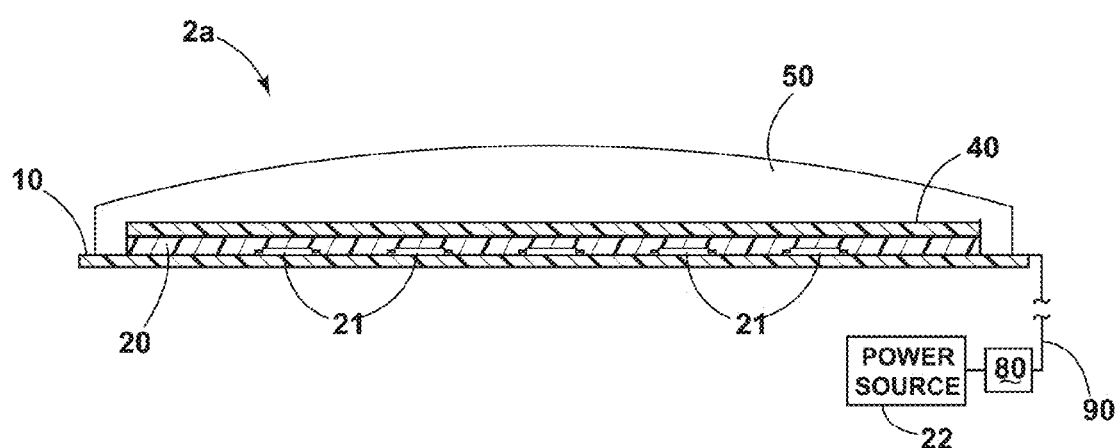
FIG. 2B is a cross-sectional view of the illuminated vehicle emblem assembly shown in FIG. 2 along line IIB-IIB according to a second embodiment.

For purposes of description herein, the terms "upper," "lower," "right," "left," "rear," "front," "top," "bottom," "vertical," "horizontal," and derivatives thereof shall relate to the invention as oriented in FIGS. 2A and 2B. However, the invention may assume various alternative orientations, except where expressly specified to the contrary. In addition, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
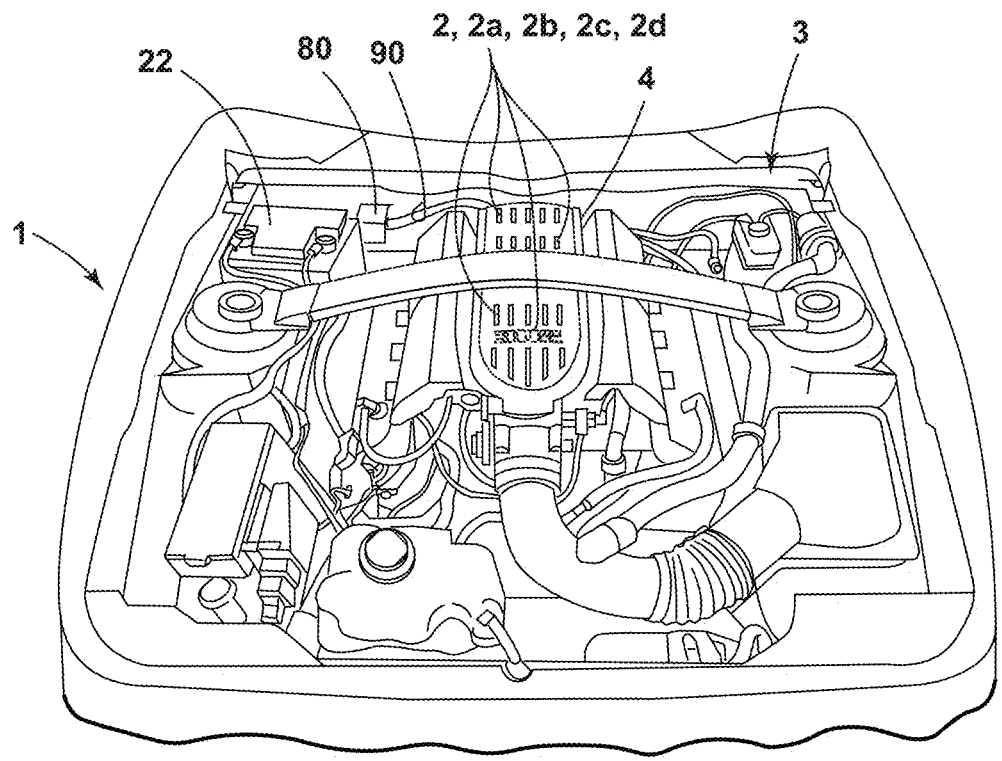
FIG. 1 is a perspective view of the engine compartment of a vehicle (hood removed for clarity) with illuminated emblem assemblies mounted to an engine at various locations.

Referring now to FIG. 1, an engine compartment 3 of vehicle 1 is generally illustrated with its hood removed for clarity. Various illuminated vehicle emblem assemblies 2, 2a, 2b, 2c, 2d are shown mounted to an engine 4 within the engine compartment 3. Vehicle 1 may be an automobile, truck, bus, van or other type of vehicle capable of displaying illuminated vehicle emblem assemblies 2-2d. As shown, the illuminated emblem assemblies 2-2d are configured in various shapes and designs. Further, emblem assemblies 2-2d are mounted to engine 4. It should be appreciated that emblem assemblies 2-2d may be configured in any of a myriad of shapes and designs for use within engine compartment 3, or in other interior locations within the vehicle 1. Under ambient lighting conditions, emblem assemblies 2-2d exhibit a chrome-like or mirrored appearance under the hood of vehicle 1 within engine compartment 3. More specifically, a chromatic layer 40 (and its shape, design and/or surface appearance) within the assemblies 2-2d (see FIGS. 2, 2A, 2B, 7-7C and 8-8B) can be viewed under ambient light conditions. Under low light or nighttime conditions, emblem assemblies 2-2d are illuminated and their exterior surfaces appear with a uniform glow.

Vehicle emblem assemblies 2, 2a, 2b, 2c, 2d are coupled to a power supply 22 via wiring 90 and controller 80, as also shown in FIG. 1. Controller 80 is arranged to control assemblies 2-2d in this configuration. Power supply 22 may be a standard vehicle battery, or a separate battery or another power source within the vehicle. When vehicle emblem assembly 2-2d is switched to an illuminated state by controller 80, power supply 22 provides the power necessary for the illumination. Vehicle emblem assembly 2-2d may be switched to an illuminated state by the engagement of a manual switch (not shown), a controller 80 (as shown in FIG. 1) operating according to a predetermined switching algorithm, or another suitable switching configuration.

Figure 1A:
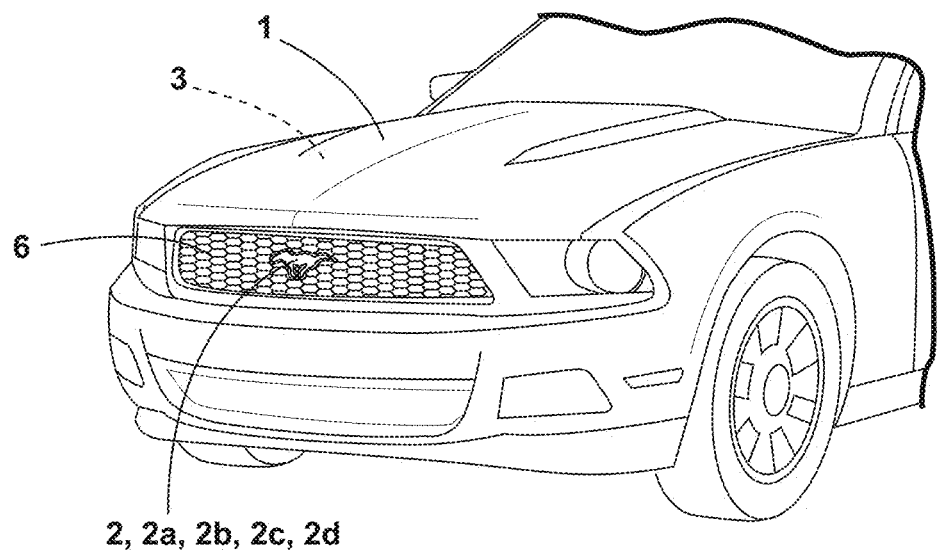
FIG. 1A is a perspective view of a vehicle with an illuminated emblem assembly mounted to the grill of the vehicle.

FIG. 1A generally depicts the front view of vehicle 1 and an illuminated emblem assembly 2, 2a, 2b, 2c, 2d. Here, an emblem assembly 2-2d is mounted to an exterior surface of vehicle 1, namely, grille 6. It should be appreciated that emblem assemblies 2-2d may be configured in any of a myriad of shapes, sizes and designs for use on the exterior of vehicle 1. These illuminated emblem assemblies 2-2d also exhibit a chrome-like or mirrored appearance when viewed under ambient lighting conditions (e.g., sunlight). Illuminated emblem assemblies 2-2d mounted to the exterior surfaces of vehicle 1 appear with a uniform glow under low light or nighttime conditions. Further, these assemblies 2-2d may be powered and controlled in the same fashion as the illuminated emblem assemblies 2-2d mounted in the engine compartment 3 of vehicle 1 (see FIG. 1), or other interior locations within vehicle 1.

In FIG. 2, illuminated vehicle emblem assemblies 2, 2a are depicted. As shown in this schematic, vehicle emblem assembly 2 and 2a include an encapsulation structure 50 and a backing member 10. Backing member 10 is configured to attach the illuminated emblem assembly 2 to a vehicle (not shown). Backing member 10 may be arranged as a plate, base or other suitable supporting member to mount illuminated vehicle emblem assembly 2, 2a to the vehicle. Further, backing member 10 may be configured to match the shape, features and contours of the underlying surface of the vehicle 1 at the location specified for mounting the illuminated vehicle emblem assembly 2, 2a.

Durable metals, polymers, alloys, composites and other suitable structural materials may be employed for use as backing member 10, provided that they offer high durability under long-term (greater than 10 years) ambient exposure and can be sealed with a water resistant barrier to prevent moisture ingress within the emblem. For example, the backing member 10 may comprise acrylonitrile butadiene styrene (ABS), a combination of polycarbonate and ABS, or other polymeric materials with similar properties. The backing member 10 may be opaque or mirrored to ensure that the majority of the light generated by the illuminated vehicle emblem assembly 2, 2a is focused outward, away from the vehicle. Typically, backing member 10 is injection-molded or die cut, with a first thickness of approximately 1 to 3 mm. Other thicknesses are possible depending on the desired aesthetics for the emblem assembly and/or mounting needs. Preferably, backing member 10 is injection-molded and possesses a thickness of approximately 2.5 to 3 mm.

Encapsulation structure 50 should be substantially translucent. Structure 50 should also provide a water-resistant seal between the backing member 10 and the interior components of illuminated vehicle emblem assembly 2, 2a. The encapsulation structure 50 comprises translucent polymeric materials and/or resins resistant to discoloration, crazing, cracking and other deterioration associated with exposure to ambient air, sunlight and moisture. For example, the encapsulation structure 50 may comprise acrylic, nylon, polycarbonate and/or blends of these materials.

When illuminated vehicle emblem assemblies 2, 2a are employed in applications on the exterior of vehicle 1, a variety of polymeric materials may be suitable for use as encapsulation structure 50. These materials must be durable and not yellow, discolor, craze, crack or otherwise deteriorate under ambient, environmental conditions. Preferably, encapsulation structure 50 is comprised of an acrylic material, nylon material, polycarbonate material or blend of these materials when the illuminated vehicle emblem assembly 2, 2a is mounted to the exterior of (e.g., the grille) or interior (e.g., the steering wheel) of vehicle 1. Most preferably, the encapsulation structure is comprised of a UV-stable polycarbonate material when the assembly 2, 2a is mounted to the exterior of vehicle 1. For example, encapsulation structure 50 can comprise a blend of nylon and polycarbonate constituents or primarily UV-stable polycarbonate material. In particular, these constituents may be blended at a ratio of 40 to 60% nylon to 40 to 60% polycarbonate by weight. As another example, encapsulation structure 50 can comprise a blend of nylon and polyester materials, particularly when assemblies 2, 2a are employed in high temperature environments such as the engine compartment 3 of the vehicle 1. These constituents may be blended at a ratio of 40 to 60% nylon and 40 to 60% polyester by weight.

In situations where illuminated vehicle emblem assembly 2, 2a is mounted in the engine compartment 3 of vehicle 1 (FIG. 1), the encapsulation structure 50 must be durable under the increased temperatures associated with the operation of the engine 4. The materials used for encapsulation structure 50 therefore must be heat resistant and not subject to discoloration or other deterioration under these conditions. Accordingly, encapsulation structure 50 may be comprised of acrylic materials or other plastic materials with high percentages of acrylic.

In addition, glass particles may be mixed into encapsulation structure 50 for added durability and temperature resistance. The glass particles may also provide additional light-scattering effects to further enhance the attractiveness of the emblem assembly 2, 2a. Still further, the encapsulation structure 50 may be coated with a curable, liquid-based coating that results in a translucent layer for added durability.

Encapsulation structure 50 may be fabricated according to various methods as known in the polymer processing art. For example, encapsulation structure 50 may be made using injection molding tools, equipment and processing conditions. Further, encapsulation structure 50 is attached to the backing member 10 using various mechanical, chemical and thermal techniques that provide a water-tight and durable seal between the member 10 and structure 50. These attachment techniques include sonic welding, vibration welding, hot plate welding, rotational welding, and silicone joining.

FIGS. 2A and 2B provide a cross-sectional view of the illuminated vehicle emblem 2, 2a depicted in FIG. 2. Backing member 10 is coupled, bonded or otherwise attached to encapsulation structure 50, as discussed earlier. A light-producing assembly 20 is configured above backing member 10. As depicted in FIGS. 2A and 2B, light-producing assembly 20 is mounted directly to backing member 10. It should be appreciated that light-producing assembly 20 may be coupled to or otherwise reside above backing member 10.

As shown in FIGS. 2A and 2B, light-producing assembly 20 is also coupled to power supply 22 (also referred herein and the accompanying figures as a "power source") via wiring 90 and controller 80. Controller 80 operates to control the illuminated state(s) of vehicle emblem assembly 2, 2a as described in the embodiment depicted in FIG. 1. Light-producing assembly 20 relies on power from power supply 22 to provide the illumination function of vehicle emblem assembly 2, 2a. The light-producing assembly 20 may be fabricated with a thickness from approximately 0.1 mm to 3.1 mm. When activated, light-producing assembly 20 generates light rays within illuminated vehicle emblem assembly 2, 2a. These light rays travel through the various structures within the emblem assembly 2, 2a (including the chromatic layer 40) and exit through encapsulation structure 50. The light output from the light-producing assembly is then viewed as a glowing, emanation of light through a significant portion of the exterior surface area of vehicle emblem assembly 2, 2a. In addition, some light from the emblem assembly 2, 2a may emanate around or near the edges of the backing member 10.

Various types of light sources 21 may be employed within light-producing assembly 20 to provide the illumination function. These light sources 21 may include incandescent, LED, LED-sourced fiber optic, LED-sourced light pipe, dispersed LEDs and micro-sized LEDs, and electroluminescent light-producing elements. Further, these light sources 21 may be configured within light-producing assembly 20 to provide white light or light in various colors. In addition, color light filters and/or lenses may be fitted within light source assembly 20 over light sources 21 to generate configurations of various, desired colors, and shapes through the vehicle emblem assembly 2.

In the illuminated vehicle emblem assembly 2, depicted in FIG. 2A, a translucent base region 30 is arranged over the light sources 21 and light-producing assembly 20. Preferably, base region 30 is void space. However, base region 30 may also comprise any of a variety of translucent, polymeric materials that can be processed in situ to encapsulate and/or cover light sources 21 at temperatures and under conditions that will not damage them. When base region 30 consists of such material, it provides additional sealing for the light-producing assembly 20 beneath it. Base region 30 may also be fabricated as a separate part using injection molding tools, equipment and processing conditions, and then sealed over light-producing assembly 20 and light sources 21 using known methods.

As shown in FIG. 2, the illuminated vehicle emblem assembly 2a lacks a base region 30. However, in some embodiments of assembly 2a, a small air gap may be present between the chromatic layer 40 and the light-producing assembly 20. As such, the chromatic layer 40 is over, or directly in contact with, the light-producing assembly 20 in the emblem assembly 2a.

FIGS. 2A and 2B also illustrate the chromatic layer 40, arranged over the base region 30 (e.g., as void space or translucent material) for the illuminated vehicle emblem assembly 2, and over the light-producing assembly 20 for the illuminated vehicle emblem assembly 2a. Preferably, the chromatic layer 40 is partially transmissive on the visible light spectrum. The chromatic layer 40 may be observed through the translucent encapsulation structure 50. Chromatic layer 40 gives illuminated vehicle emblem assembly 2, 2a a chrome- or mirror-like appearance. This appearance is evident when light-producing assembly 20 is not activated, and/or under ambient lighting conditions. When the light-producing assembly 20 is activated, its light can pass through the chromatic layer 40, thus providing a uniform, glowing appearance for the emblem assembly 2, 2a.

The chromatic layer 40 may be comprised of various metal particles, materials, coatings and/or paint that can produce the desired chrome- or mirror-like appearance. Chromatic layer 40 may take the form of a layer, multi-layer, film, coating or other suitable structure. It is to be understood, however, that chromatic layer 40 should be configured with a tailored density of chromatic materials to ensure that light from light-producing assembly 20 can penetrate it when the illuminated vehicle emblem assembly 2, 2a is activated in an illuminated state. Materials that may be used in chromatic layer 40 include, but are not limited to, automotive-grade metallic paint, automotive-grade silver paint, and particles or flakes containing indium, silver, chromium and/or aluminum. Preferably, chromatic layer 40 is comprised of indium-containing and aluminum-containing particles.

Chromatic layer 40 may be deposited, formed and/or applied according to various methods known in the paint, coating and metallic layer deposition art. One approach for forming the chromatic layer 40 is to employ a coating preparation of the desired chromatic particles in a water, alcohol or other organic solvent-based suspension or solution with a spray coating apparatus. The chromatic layer preparation is then used to apply multiple coatings of the chromatic particles or paint as the chromatic layer 40 to or over the light-producing assembly 20 (e.g., for the illuminated vehicle emblem assembly 2a configuration), to the base region 30 (e.g., if the base region 30 is a solid material in the illuminated vehicle emblem assembly 2 configuration) and/or to the underside of encapsulation structure 50. Applying chromatic layer 40 to the underside of the encapsulation structure 50 is a preferred approach in that it minimizes the incorporation of unwanted dust particles into the layer 40. Other constituents may be added to the chromatic layer 40 to promote bonding to these structures. The solvent, water or alcohol base is then evaporated by curing (e.g., by UV light) or an ambient evaporation process, leaving the chromatic layer 40 adhered to the light-producing assembly 20, base region 30 and/or encapsulation structure 50. Another approach is to stress relieve the light-producing assembly 20, base region 30 and/or encapsulation structure 50 with a relatively low temperature heating or low level vibration process. A voltage is then applied to the light-producing assembly 20, base region 30 and/or encapsulation structure 50. The final step is to prepare a loading of the chromatic particles (e.g., indium-containing particles) and deposit the particles onto the electrified surface of the light-producing assembly 20, base region 30 and/or encapsulation structure 50.

A further approach to forming chromatic layer 40 is to vacuum metallize the layer on encapsulation structure 50, base region 30 (e.g., for the illuminated vehicle emblem assembly 2 configuration) and/or the light-producing assembly 20 (e.g., for the illuminated vehicle emblem assembly 2a configuration). In this case, chromatic layer 40 is comprised of chromium-, aluminum- or other metal-containing particles. A chromatic layer 40 formed by vacuum metallization may also be sealed with a curable, polymeric translucent coating. In addition, chromatic layer 40 may be formed in situ with encapsulation structure 50. For example, chromatic layer 40 could comprise a metallized polymeric film (e.g., a polyethylene terephthalate film) that is draped over an injection mold or cut to the dimensions of such a mold during fabrication of encapsulation structure 50.

Also depicted in FIGS. 2A and 2B is the encapsulation structure 50. As described earlier, encapsulation structure 50 is translucent and provides a water-resistant seal between the backing member 10 and the interior components of illuminated vehicle emblem 2, 2a. Encapsulation structure 50 also seals the light-producing assembly 20, and chromatic layer 40 from the ambient environment. The sealing function of encapsulation structure 50 is particularly important to ensure that excess moisture does not penetrate and cause a short circuit to the light-producing assembly 20 and light sources 21.

FIGS. 3-8B depict additional embodiments of the illuminated vehicle emblem assembly 2. In general, each of these embodiments can be configured according to the schematic and description of the emblem assembly 2, as shown in FIGS. 2 and 2A with light sources 21. However, each of the embodiments depicted in FIGS. 3-8B relies on a certain type of light source within light-producing assembly 20, essentially as a substitute for the light sources 21 shown in FIGS. 2 and 2A for emblem assembly 2. It is to be understood that various light sources other than those described here may be employed in light-producing assembly 20, as depicted in FIGS. 2-8B, to the same or similar effect.

Referring to FIGS. 3, 3A, 3B and 3C, an embodiment of illuminated vehicle emblem assembly 2 is depicted with a light-producing assembly 20 containing an electroluminescent light source assembly 60. The illuminated vehicle emblem assembly 2 is otherwise configured as described in connection with the emblem assembly 2 depicted in FIGS. 2 and 2A. Optionally, design features 100 may be embedded within encapsulation structure 50, as shown. These features may be fabricated of various materials as known in the art. Further, the features 100 may be translucent, tinted or opaque.

Electroluminescent light source assembly 60 is to be configured according to a multi-layer structure that produces light through electroluminescence. Preferably, electroluminescent assembly 60 is arranged as shown in FIG. 3C. A carbon layer 62 is arranged on phosphor layer 64. Carbon layer 62 is coupled to a power supply 22 (see FIG. 3B) and serves as a first electrode in the electroluminescent assembly 20 configuration. The phosphor layer 64 may comprise aluminum and silver nitrate materials. A die eyelet structure 66 is arranged under the phosphor layer 64. Finally, a transparent electrode 67 is coupled to power supply 22 and configured under die eyelet structure 66. Transparent electrode 67 may be comprised (as shown in FIG. 3C) of two layers: an indium tin oxide layer 68 and an antimony-tinzirconium oxide layer 69. Transparent electrode 67 may also be configured with other suitable transparent electrode materials and configurations.

Figure 4:
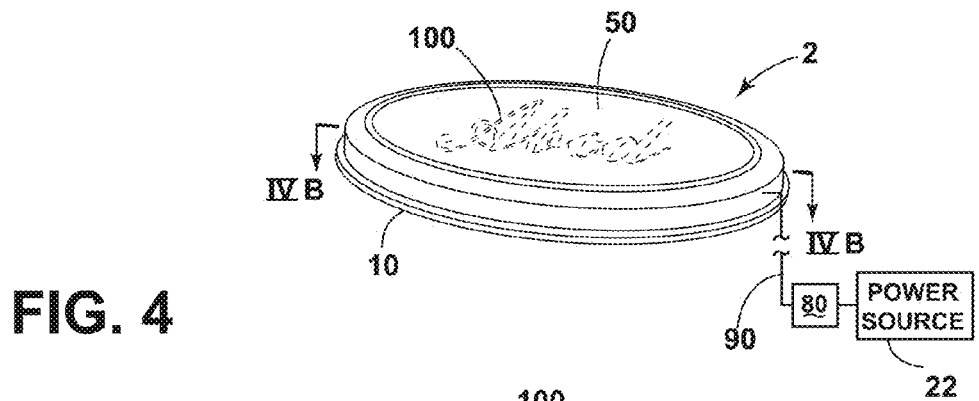
FIG. 4 is a top-down perspective view of an illuminated vehicle emblem assembly, according to a fourth embodiment.
Figure 4A:
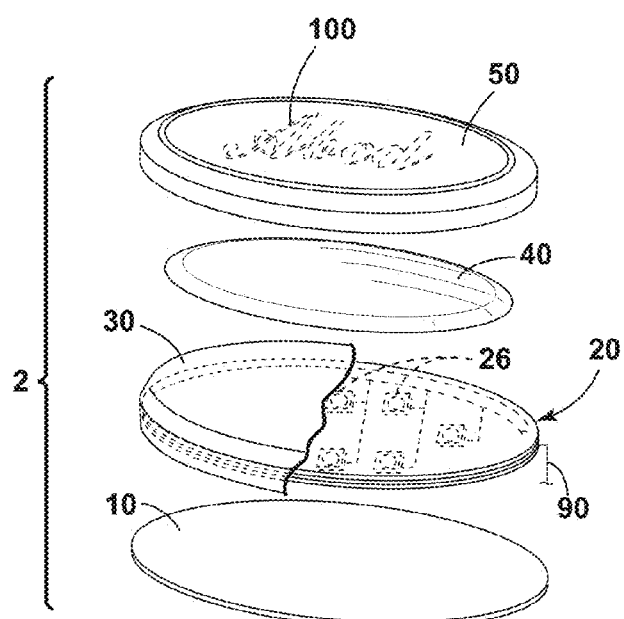
FIG. 4A is an exploded, perspective view of the illuminated vehicle emblem assembly shown in FIG. 4.
Figure 4B:
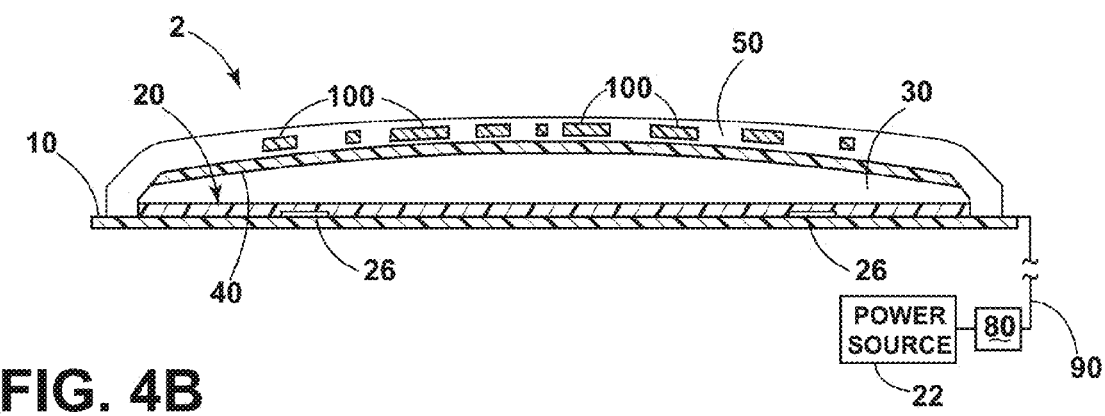
FIG. 4B is a cross-sectional view of the illuminated vehicle emblem assembly shown in FIG. 4 along line IVB-IVB.

As depicted in FIGS. 4, 4A and 4B, a further embodiment of illuminated vehicle emblem assembly 2 is depicted with a light-producing assembly 20 that contains light emitting diode (LED) sources 26. LED sources 26 may also be configured within light-pipe arrangements (not shown). One or more LED sources 26 may be configured within light-producing assembly 20. Further, LED sources 26 are coupled to, and obtain power for their illumination function from, power supply 22 (see FIG. 4B). It should be appreciated that various types of LED sources, including those that emanate light of different colors, may be employed in this embodiment. The illuminated vehicle emblem assembly 2 shown in FIGS. 4, 4A and 4B is otherwise configured as described in connection with the schematic of the emblem assembly 2 depicted in FIGS. 2 and 2A.

Figure 5:
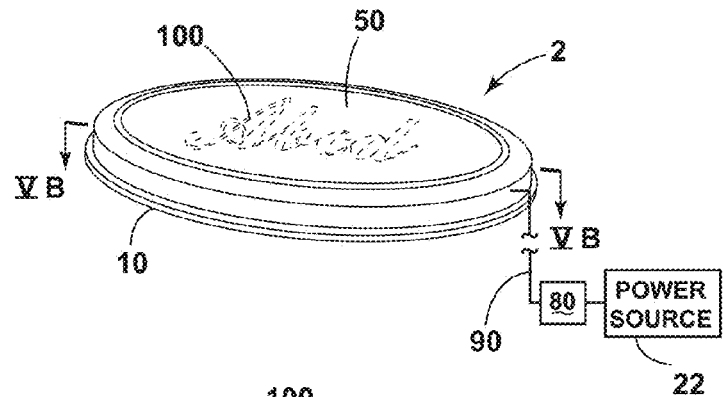
FIG. 5 is a top-down perspective view of an illuminated vehicle emblem assembly, according to a fifth embodiment.
Figure 5A:
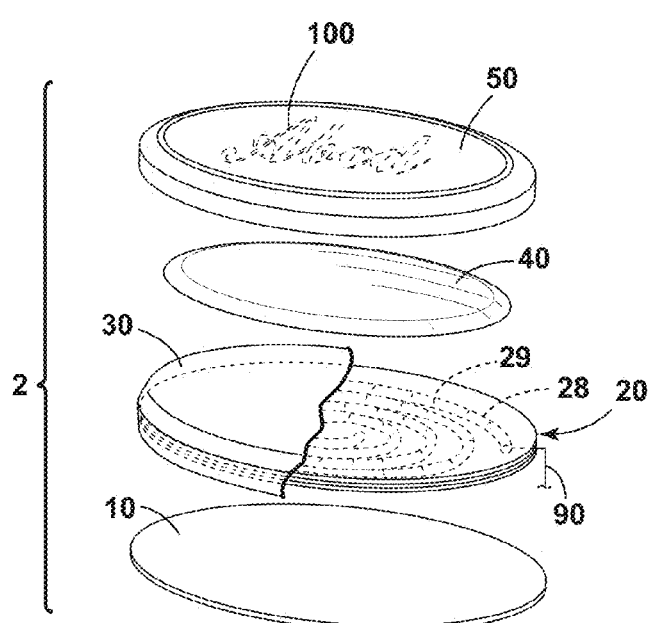
FIG. 5A is an exploded, perspective view of the illuminated vehicle emblem assembly shown in FIG. 5.
Figure 5B:
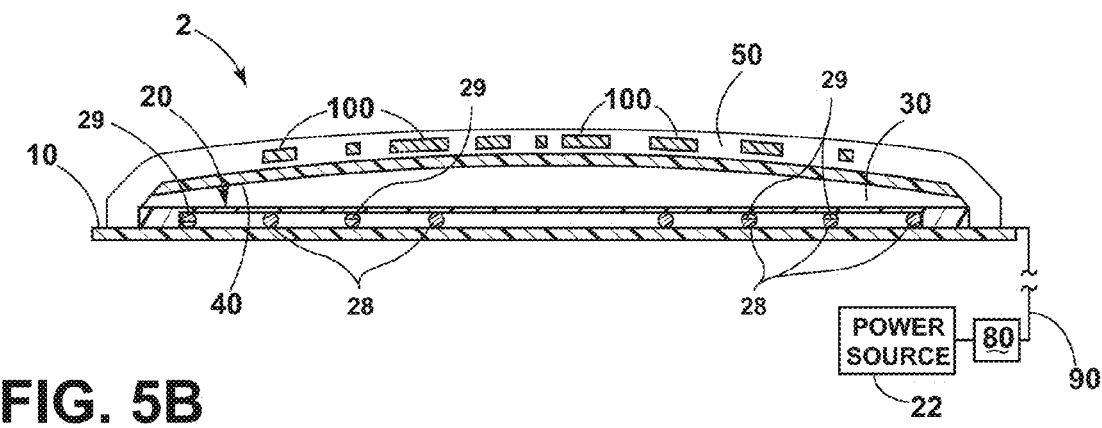
FIG. 5B is a cross-sectional view of the illuminated vehicle emblem assembly shown in FIG. 5 along line VB-VB.

An additional embodiment of illuminated vehicle emblem assembly 2 is depicted in FIGS. 5, 5A and 5B with a light-producing assembly 20 containing fiber optic light cables 28. One or more fiber optic light cables 28 may be configured within light-producing assembly 20. In addition, the fiber optic light cable(s) 28 are coupled to, and obtain power for their illumination function from, power supply 22 (see FIG. 5B). Further, slits 29 are provided in fiber optic light cables 28 to ensure that light rays produced within the cables 28 are directed outward through base region 30, chromatic layer 40 and encapsulation structure 50. It should be understood that various types of fiber optic light cables 28, including those that emanate light of different colors, may be employed in this embodiment. The illuminated vehicle emblem assembly 2 shown in FIGS. 5, 5A and 5B is otherwise configured as described in connection with the schematic of emblem assembly 2 depicted in FIGS. 2 and 2A.

Figure 6:
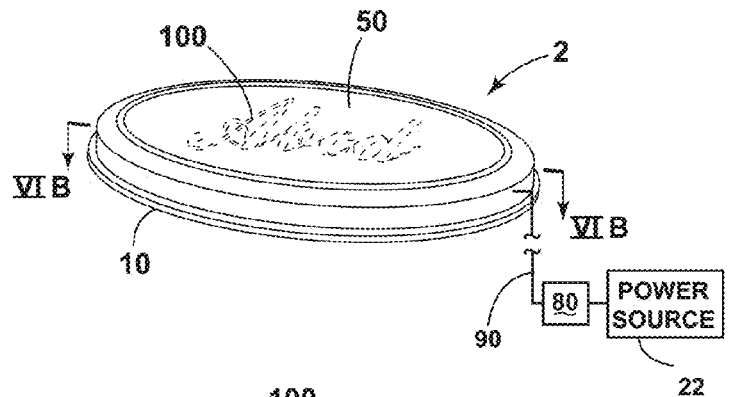
FIG. 6 is a top-down perspective view of an illuminated emblem assembly, according to a sixth embodiment.
Figure 6A:
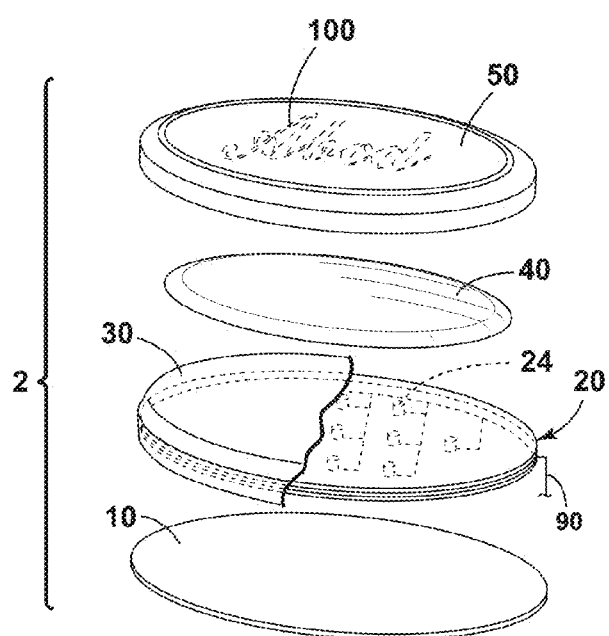
FIG. 6A is an exploded, perspective view of the illuminated emblem assembly shown in FIG. 6.
Figure 6B:
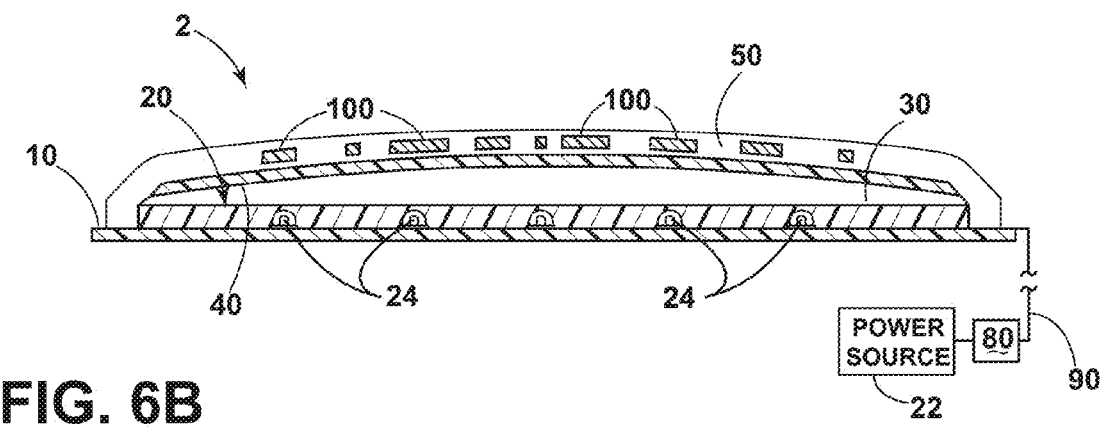
FIG. 6B is a cross-sectional view of the illuminated emblem assembly shown in FIG. 6 along line VIB-VIB.

Referring to FIGS. 6, 6A and 6B, an embodiment of illuminated vehicle emblem assembly 2 is depicted with a light-producing assembly 20 that contains incandescent light bulbs 24. One or more incandescent light bulbs 24 are configured within light-producing assembly 20. Further, the light bulbs 24 are coupled to and obtain power for their illumination function from power supply 22 (see FIG. 6B). It should be appreciated that various types of incandescent light bulbs and filters, including those that emanate light of different colors, may be employed in this embodiment of illuminated vehicle emblem assembly 2. The illuminated vehicle emblem assembly 2 shown in FIGS. 6, 6A and 6B is otherwise configured as described in connection with the schematic of the emblem assembly 2 depicted in FIGS. 2 and 2A.

Additional embodiments of the disclosure are directed to illuminated emblem assemblies 2c, 2d, as depicted in FIGS. 7, 7A, 7B and 7C. The emblem assemblies 2c, 2d are generally configured the same as the emblem assembly 2 depicted in FIGS. 4, 4A and 4B, with like-numbered elements having the same or comparable function and structure. However, emblem assemblies 2c, 2d possess additional attributes and features. In the emblem assembly 2c, 2d, the light-producing assembly 20 contains a plurality of micro-sized light-emitting diode (LED) sources 26a. These LED sources 26a are arranged within a semiconductor ink 26d. Further, a positive electrode 26c is electrically connected to at least a portion of the LED sources 26a, and the controller 80 and the power source 22 via wiring 90. Preferably, the positive electrode 26c comprises a conductive epoxy, such as a silver-containing or copper-containing epoxy. The positive electrode 26c is arranged over a substrate 10a, preferably comprising a polyethylene terephthalate (PET) material on the order of 0.010 to 0.040 inches thick. Further, the substrate 10a is located above the backing member 10. Similarly, a negative electrode 26b is electrically connected to at least a portion of the LED sources 26a, and the controller 80 and the power source 22 via wiring 90. Preferably, the negative electrode 26b comprises a transparent or translucent conductive material such as indium tin oxide.

Figure 7:
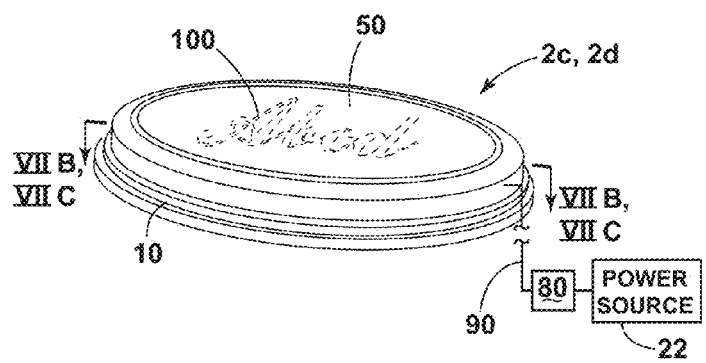
FIG. 7 is a top-down perspective view of an illuminated emblem assembly, according to two embodiments.
Figure 7A:
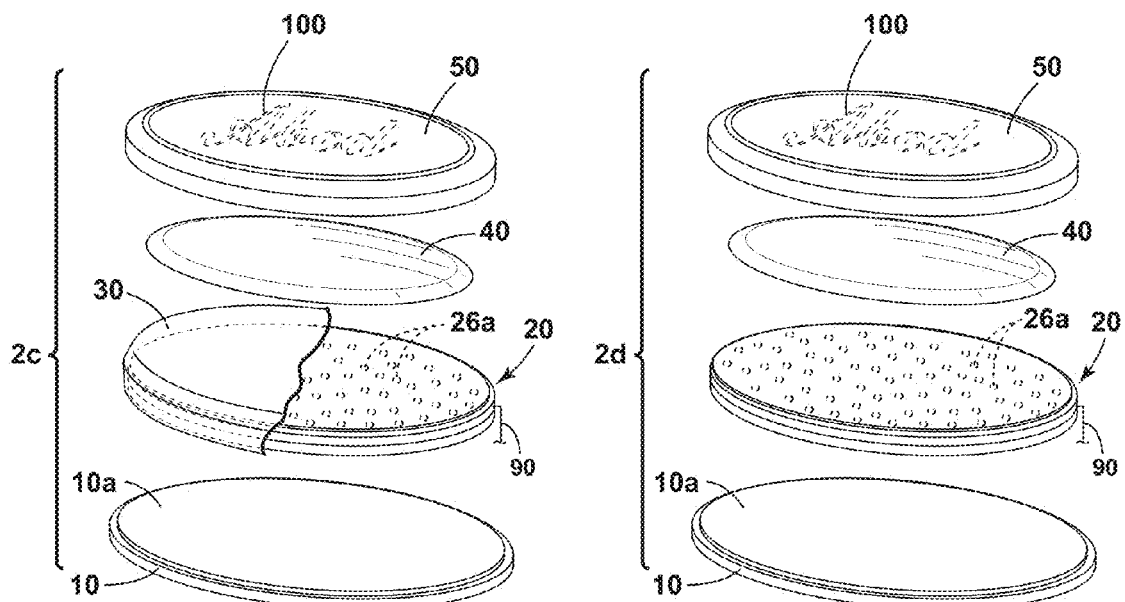
FIG. 7A is an exploded, perspective view of the illuminated emblem assemblies shown in FIG. 7.
Figure 7B:
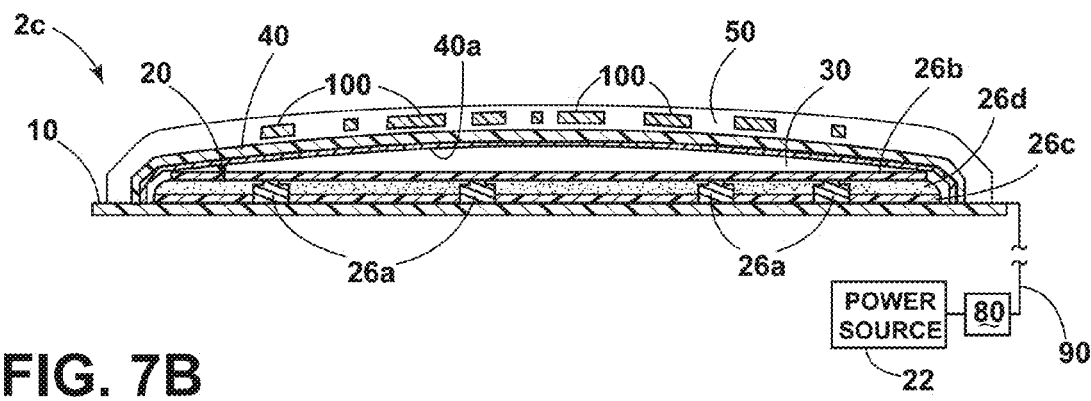
FIG. 7B is a cross-sectional view of the illuminated emblem assembly shown in FIG. 7 along line VIIB-VIIB according to a seventh embodiment.
Figure 7C:
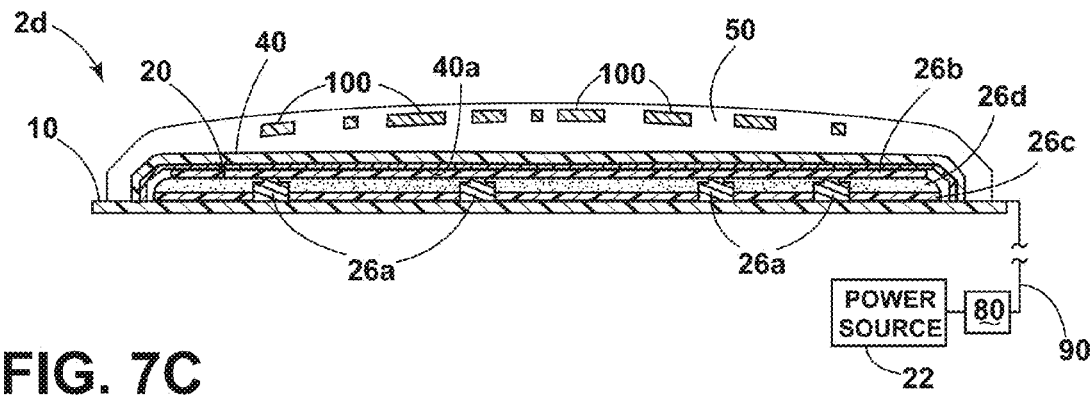
FIG. 7C is a cross-sectional view of the illuminated emblem assembly shown in FIG. 7 along line VIIC-VIIC according to an eighth embodiment.

As depicted in FIGS. 7B and 7C, the micro-sized LED sources 26a of the illuminated vehicle emblem assemblies 2c, 2d can be dispersed in a random or controlled fashion within the semiconductor ink 26d. The micro-sized LED sources 26a can comprise gallium nitride elements on the order of 20-30 µm in size, and the semiconductor ink 26d can include various binders and dielectric material including but not limited to one or more of gallium, indium, silicon carbide, phosphorous and/or translucent polymeric binders. As such, thousands or more of micro-sized LED sources 26a can be contained in the ink 26d. In some embodiments, these LED sources 26a and semiconductor ink 26d are sourced from Nth Degree Technologies Worldwide Inc. The ink 26d containing the LED sources 26a can be applied through various printing processes, including ink jet and silk screen processes to selected portion(s) of the substrate 10a. More specifically, it is envisioned that the LED sources 26a are dispersed within the ink 26d, and shaped and sized such that a substantial quantity of them preferentially align with the positive and negative electrodes 26c and 26b during deposition of the ink 26d. The portion of the LED sources 26a that ultimately are electrically connected to the electrodes 26b and 26c can be illuminated by the combination of the power source 22, controller 80 and wiring 90. In some aspects, a power source operating at 12 to 16 VDC from a vehicular power source (without the need for a transformer) can be employed for power source 22 to illuminate the micro-sized LED sources 26a.

Still referring to FIGS. 7, 7A and 7B, the illuminated vehicle emblem assembly 2c also includes a translucent base region 30 over the light sources 26a and the light-producing assembly 20. In particular, the translucent base region 30 is employed over the light-producing assembly 20 to protect and seal it from the environment, including moisture. As such, the base region 30 can be configured to encapsulate the light-producing assembly 20 containing the plurality of LED sources 26a.

Alternatively, as referring to FIGS. 7, 7A and 7C, the illuminated vehicle emblem assembly 2d lacks a base region 30. However, in some embodiments of assembly 2d, a small air gap may be present between the chromatic layer 40 and the light-producing assembly 20. As such, the chromatic layer 40 is over, or directly in contact with, the light-producing assembly 20 in the emblem assembly 2d.

With further regard to the illuminated vehicle emblem assemblies 2c, 2d depicted in FIGS. 7-7C, it should be understood that these assemblies also include a chromatic layer 40 with the same structure, function and processing as the like-numbered, chromatic layer 40 employed in the illuminated vehicle emblem assemblies described earlier (see FIGS. 2-2B). In particular, FIGS. 7-7C illustrate that the chromatic layer 40, can be arranged over the base region 30 (e.g., as void space or translucent material) for the illuminated vehicle emblem assembly 2c, and over the light-producing assembly 20 for the illuminated vehicle emblem assembly 2d. Preferably, the chromatic layer 40 is partially transmissive on the visible light spectrum. The chromatic layer 40 may be observed through the translucent encapsulation structure 50. Chromatic layer 40 gives illuminated vehicle emblem assembly 2c, 2d a chrome- or mirror-like appearance. This appearance is evident when light-producing assembly 20 is not activated, and/or under ambient lighting conditions. When the light-producing assembly 20 is activated, its light can pass through the chromatic layer 40, thus providing a uniform, glowing appearance for the emblem assembly 2c, 2d.

During operation of the illuminated vehicle emblem assembly 2c, 2d depicted in FIGS. 7-7C, the LED sources 26a can be illuminated by the controller 80 and the power source 22. When activated, the LED sources 26a provide small pixels of light that shine through the chromatic layer 40. Given the relatively random nature of the orientation and spacing of the sources 26a, and their relatively small size, interesting lighting effects can be produced, particularly in connection with the chromatic layer 40. When the LED sources 26a within the light-producing assembly 20 are not activated, the assembly 2c, 2d exhibits a mirror-like appearance by virtue of the chromatic layer 40. The mirror-like appearance is also consistent with the shape of the layer 40, as viewed through the encapsulation structure 50. As depicted in FIGS. 7, 7A, 7B and 7C, the emblem assembly 2c, 2d also may include design features 100 that are contained within or otherwise surrounded by the encapsulation structure 50. These design features 100, which may in some cases also exhibit a mirror-like appearance, are also visible through the encapsulation structure 50 when the LED sources 26a are in a dormant state.

In some aspects of the illuminated vehicle emblem assembly 2c, 2d, as depicted in FIGS. 7-7C, a light-diffusing layer 40a is employed between the chromatic layer 40 and the translucent base region 30 (e.g., for illuminated vehicle emblem assembly 2c) and between the chromatic layer 40 and the light-producing assembly 20 (e.g., for illuminated vehicle emblem assembly 2d). The light-diffusing layer 40a diffuses the light emanating from each of the sources 26a connected to the electrodes 26b and 26c to provide a more uniform glow through the chromatic layer 40. Such a uniform glow from an assembly 2c, 2d containing a light-diffusing layer 40a may be preferable to the more pixelated appearance of an assembly 2c, 2d that lacks the light-diffusing layer 40a.

Figure 8:
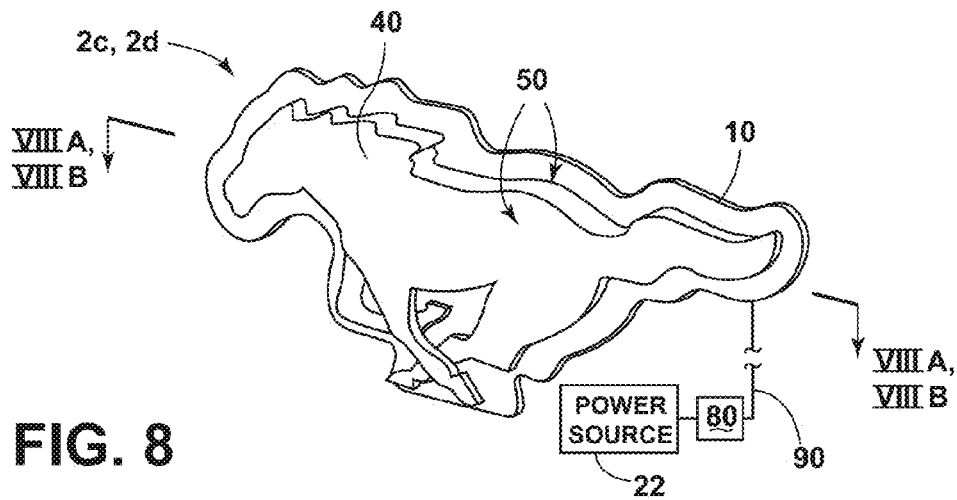
FIG. 8 is an enlarged, top-down perspective view of an illuminated emblem assembly according to two embodiments.
Figure 8A:
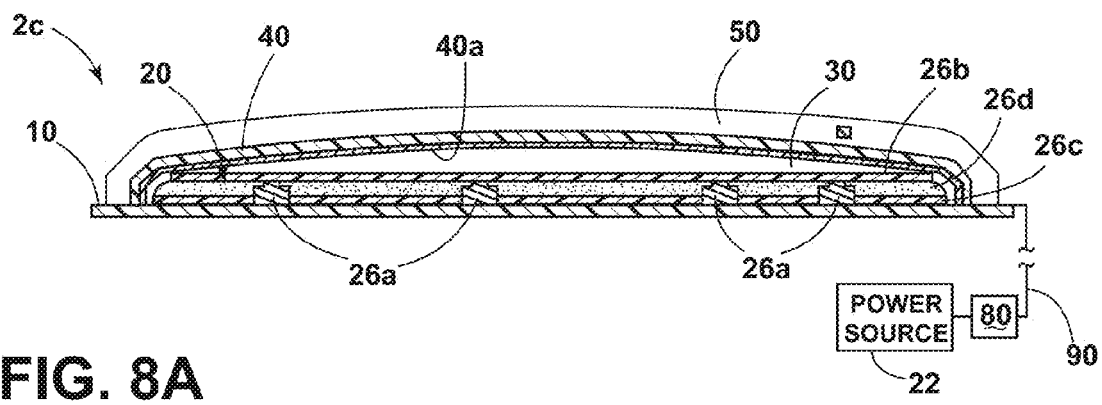
FIG. 8A is a cross-sectional view of the illuminated emblem assembly shown in FIG. 8 along line VIIIA-VIIIA according to a ninth embodiment.
Figure 8B:
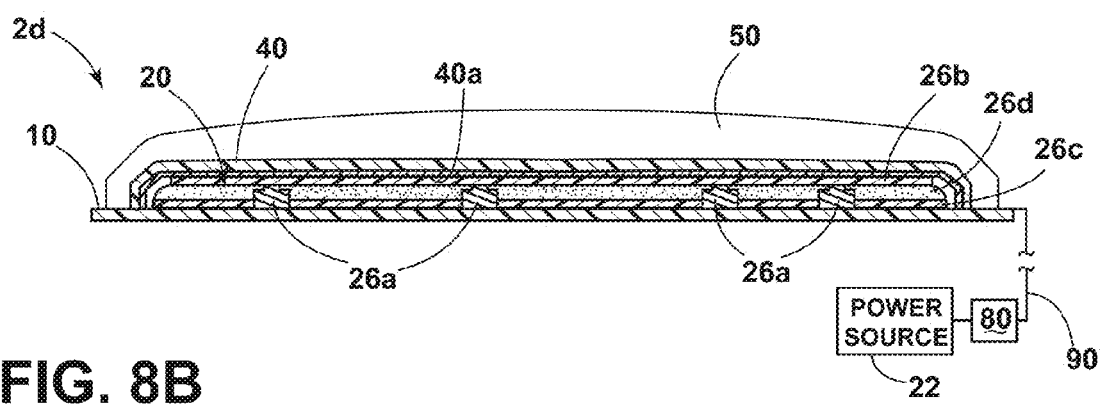
FIG. 8B is a cross-sectional view of the illuminated emblem assembly shown in FIG. 8 along line VIIB-VIIB according to a tenth embodiment.

Referring now to FIGS. 8, 8A and 8B, a further embodiment of the disclosure is depicted in the form of illuminated emblem assembly 2c, 2d configured in the shape of a logo. Here, the emblem assembly 2c, 2d possesses virtually the same structure as the respective emblem assemblies 2c, 2d depicted in FIGS. 7, 7A, 7B and 7C. The chromatic layer 40 is configured in a particular shape such that the shape is viewable through the encapsulation structure 50 when the light-producing assembly 20 and LED sources 26a are inactive. Notably, the encapsulation structure 50 surrounds the chromatic layer 40 and is sealed to the backing member, thus protecting them from the environment.

It should be appreciated that the foregoing embodiments of illuminated vehicle emblem assembly 2, 2a, 2b, 2c, 2d, and variants of these embodiments, can be employed in various shapes, styles and configurations throughout engine compartment 3, and the interior and exterior of vehicle 1. In particular, the backing member 10 and/or encapsulation structure 50 can be employed in these shapes, styles and configurations. Further, design features 100, such as those employed in the emblem assembly 2 depicted in FIG. 3B, may be embedded within encapsulation structure 50. Under ambient conditions, these design features 100 can appear with a chrome- or mirror-like finish, enhancing the attractiveness of the shape, logo or other graphics evident in the emblem assembly 2-2d via the appearance of chromatic layer 40. Further, these emblem assemblies 2-2d may be illuminated by the use of manual switches or other types of controller-driven configurations under low light or nighttime conditions. It is also possible to configure the power supply 22 and wiring arrangement 90 coupled to the light-producing assembly 20 for increased illumination flexibility. Variable intensity lighting options may be employed as light sources 21 in the light-producing assembly 20 including, but not limited to, LEDs, electroluminescent arrays, fiber optic cables and incandescent bulbs. A vehicle emblem assembly 2-2d configured with variable intensity light sources 21 can be adjusted to produce interesting lighting effects that complement its chrome- or mirror-like finish.

Accordingly, the illuminated vehicle emblem assemblies 2, 2a, 2b, 2c, 2d possess many features that are advantageous in automotive applications. For example, the features that provide the chrome- or mirror-like appearance in the emblem assemblies 2-2d are protected from the outside environment by the encapsulation structure 50. The chromatic layer 40 and light-producing assembly 20 elements are less susceptible to peeling, flaking and other deterioration. In addition, the glowing appearance of the vehicle emblem assemblies 2-2d (when activated in an illuminated state) should not be distracting to vehicle operators compared to other, directional lighting sources employed by many other vehicle components. Still further, most of the lighting options for the light sources 21 use little power and can be supported by standard vehicle batteries. Hence, the illuminated vehicle emblem assemblies 2-2d can be arranged at various locations on the vehicle 1, requiring a wiring connection to the main power bus of the vehicle.

Variations and modifications can be made to the aforementioned structure without departing from the concepts of the present invention, and further such concepts are intended to be covered by the following claims unless these claims by their language expressly state otherwise.

We claim:

1. An illuminated emblem assembly for an engine compartment, comprising:
 a power source;
 a light-producing assembly that is coupled to the power source, supported by a backing member, and comprises (a) a chromatic layer comprising an emblem shape over and in contact with the light-producing assembly and (b) a plurality of randomly oriented light-emitting diode sources; and
 a polycarbonate sealing structure over the chromatic layer that seals the backing member, the light-producing assembly, and the chromatic layer,
 wherein the shape is visible under ambient lighting.

2. The emblem assembly according to claim 1, wherein the backing member is mounted to a vehicle.

3. The emblem assembly according to claim 2, wherein the backing member is mounted to a location within the engine compartment of the vehicle and the translucent sealing structure comprises a blend of nylon and polycarbonate material at a ratio of 40 to 60% nylon to 40 to 60% polycarbonate material by weight.

4. The emblem assembly according to claim 1, wherein the sealing structure comprises a design feature.

5. An illuminated emblem assembly for an engine compartment, comprising:
 a power source;

a light-producing assembly coupled to the power source, supported by a backing member, and comprises (a) a chromatic layer over and in contact with the light-producing assembly and (b) a plurality of randomly oriented light-emitting diode sources; and a UV-stable polycarbonate sealing structure over the chromatic layer that comprises a design feature and seals the backing member, the light-producing assembly, and the chromatic layer.

6. The emblem assembly according to claim 5, wherein the backing member is mounted to a vehicle.

7. The emblem assembly according to claim 6, wherein the backing member is mounted to a location within the engine compartment of the vehicle and the translucent sealing structure comprises a blend of nylon and polycarbonate material at a ratio of 40 to 60% nylon to 40 to 60% polycarbonate material by weight.

8. An illuminated emblem assembly for an engine compartment, comprising:
a power source;
a light-producing assembly that is coupled to the power source, supported by a backing member, and comprises (a) a chromatic layer over and in contact with the light-producing assembly and (b) a plurality of randomly oriented light-emitting diode sources; and
a translucent sealing structure over the chromatic layer that seals the backing member, the light-producing assembly, and the chromatic layer.

9. The emblem assembly according to claim 8, wherein the backing member is mounted to a vehicle.

10. The emblem assembly according to claim 8, wherein the backing member is mounted to a location within the engine compartment of a vehicle and the translucent sealing structure comprises a blend of nylon and polycarbonate material at a ratio of 40 to 60% nylon to 40 to 60% polycarbonate material by weight.

11. The emblem assembly according to claim 8, wherein the light-producing assembly further comprises a negative electrode layer, a positive electrode layer and a dielectric region, each in electrical contact with at least a portion of the plurality of randomly oriented light-emitting diode sources.

12. The emblem assembly according to claim 11, wherein the light-emitting diode sources are micro-sized light-emitting diode elements that comprise gallium nitride.

13. The emblem assembly according to claim 12, wherein the micro-sized light-emitting diode elements are arranged on the positive electrode layer in the form of an ink.

14. The emblem assembly according to claim 8, wherein the sealing structure comprises a design feature.

* * * * *